June 16, 1925.

V. LANCIA 1,542,511

SHOCK ABSORBER

Filed Dec. 13, 1922     2 Sheets-Sheet 1

Inventor
V. Lancia
by Lawrence Langner
Atty.

June 16, 1925.  1,542,511

V. LANCIA

SHOCK ABSORBER

Filed Dec. 13, 1922  2 Sheets-Sheet 2

Inventor
V. Lancia
by Lawrence Langner
Atty.

Patented June 16, 1925.

1,542,511

UNITED STATES PATENT OFFICE.

VINCENZO LANCIA, OF TURIN, ITALY.

SHOCK ABSORBER.

Application filed December 13, 1922. Serial No. 606,723.

*To all whom it may concern:*

Be it known that I, VINCENZO LANCIA, subject of the King of Italy, residing at Turin, Italy, have invented new and useful Improvements in Shock Absorbers; and I do hereby declare the following to be a full, clear, and exact description of the same.

The present invention relates to shock absorbers with liquid damping medium and particularly to the absorbers intended to damp the respective movements of two parts, as used in the suspension of motor cars and the like.

The present invention has for its object a shock absorber of the above class in which no packing is required and leakages are efficiently prevented.

Figure 1:
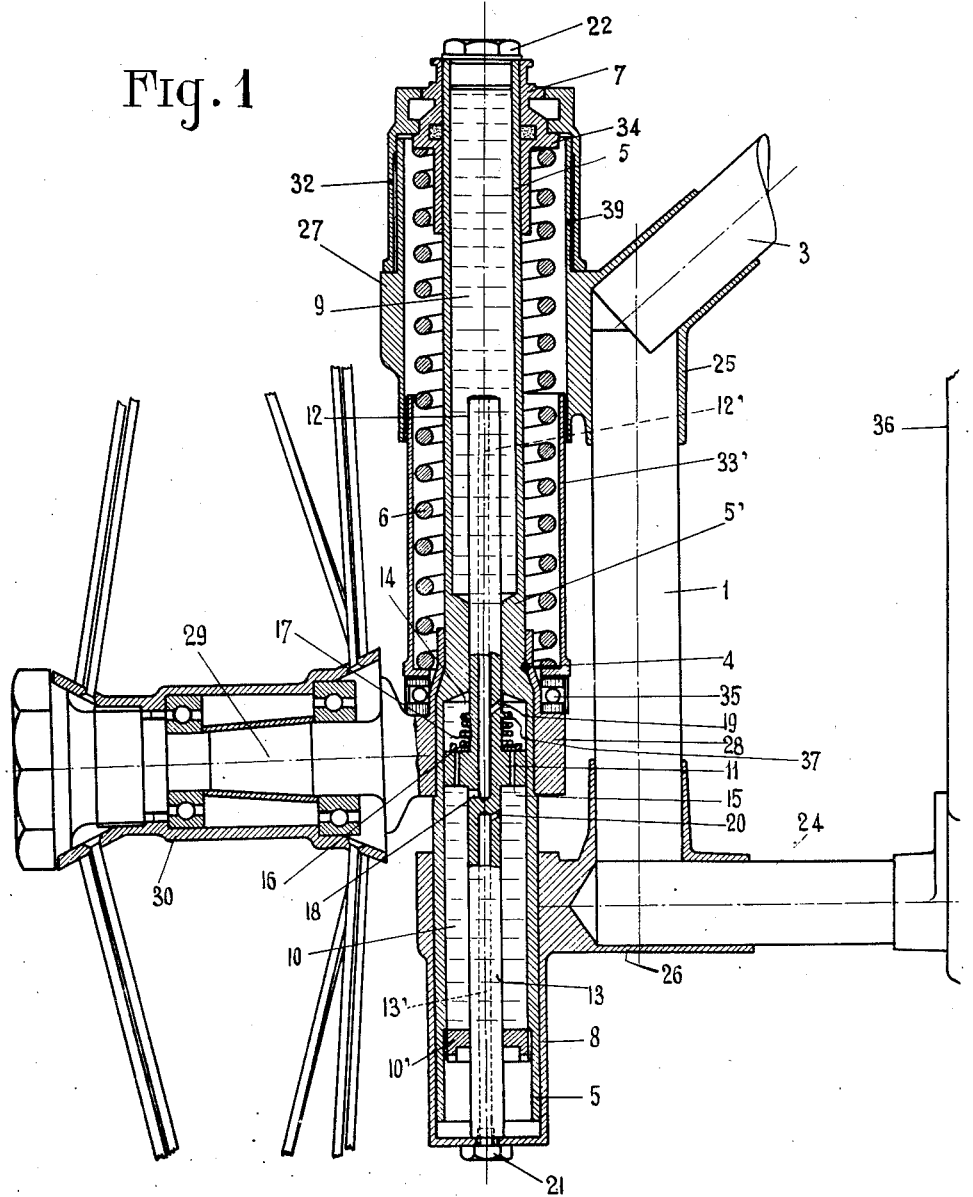
Figure 3:
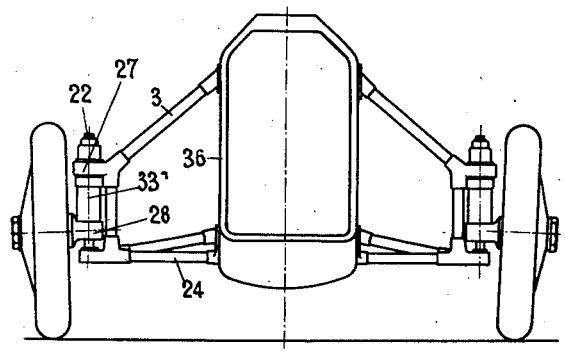
Figure 2:
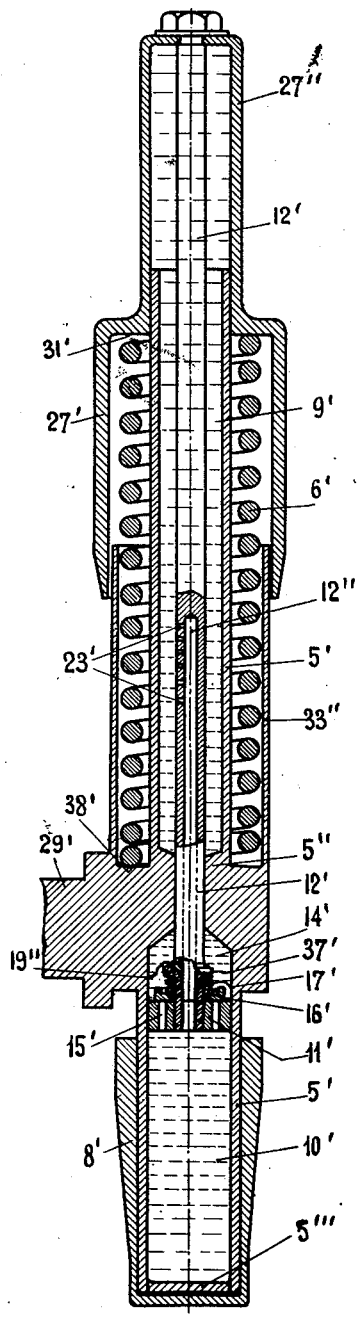

On the annexed drawing are shown by way of example two embodiments of the present invention and Figure 1 is a central section of an absorber adapted for the resilient mounting of a wheel on a motor car; Figure 2 is the central section of a modified construction and Figure 3 is a general front view of a motor car in which the present invention is embodied in the suspension for the front wheels.

As shown on said drawing, at the front end of the car are provided structures comprising bars 1—3—24 fastened to the car frame 36 and interconnected by coupling members 25 and 26 which provide bearings 27 and 8 respectively.

In said bearings is mounted to rotate and move longitudinally a hollow member 5 hereinafter particularly described, on which is fastened, by a pin 4, a collar 28 having integral therewith a spindle 29 for the wheel hub 30.

Therefore the absorber is intended to damp the longitudinal motion of the collar 28 and member 5 (due to the shocks acting on the wheel) with respect to the bearings 8 and 27.

The said vertical member 5 is hollow and its top end is journalled in a sleeve 7 which in turn is engaged in the bearing 27 by a cap 32 screwed on an extension 39 of the same bearing; said sleeve 7 is provided with a flange 34 for the upper end of a spring 6 whose lower end bears on said collar 28 through the intermediate of an antifriction bearing 35. The lower end of said member 5 is mounted in the bearing 8 as above described. In the intermediate portion of said hollow member 5 is provided a bored partition 5' separating in it two spaces 9 and 10 In the space 10 is located a piston 11 solid with a tubular stem 12 passing through the bore of the partition 5' and opening into the space 9; on the opposite side of the piston 11 projects a tubular stem 13 having its lower end fastened to the bottom of the sleeve 8.

Thus said piston 11 provides in the space 10 a chamber 14 enclosed between the said piston and the partition 5'. In the piston 11 are provided passages 15 which are usually closed by a valve 16 acted on by a spring 17 which rests on a flange 37 of the stem 12, and the passage 12' of the stem 12 opens in the space 10 through port 18 and in the chamber 14 through the port 19, while the passage 13' of the stem 13 leads to the space 10 through a port 20 and has its lower end closed by a plug 21. A plug 22 is screwed in the top end of the member 5 to close the space 9, while the space 10 is closed at its bottom by a bored plug 10' sliding on the stem 13.

A sleeve 33 sliding freely in the bearing 27 encircles the spring to protect it.

For the operation the plug 22 is removed and a liquid, which usually is oil, is introduced in the space 9. This oil flows then through the passage 12' of the stem 12, port 19 and chamber 14 as well as through port 18 and space 10 and finally may escape through the passages 20 and 13', the plug 21 being removed for the air escape.

The issue of oil at the bottom of the bearing 8 means that the absorber is filled in; then the plugs 21 and 22 are put in position and the absorber is in condition of operation.

In operation when the wheel is suddenly moved upwardly, the member 5 moves with it against the spring 6 while the piston 11 is stationary being fastened to the bearing 8 and therefore an increase of pressure arises in the space 10 while a suction is produced in the chamber 14.

Then the valve 16 clears the passages 15 of the piston 11 and the liquid flows therethrough from the space 10 into the chamber 14. Of course the total sectional area of the passages 15 is very reduced with respect to that of the piston 11 and therefore the liquid flow is made very slow and the respective movements of the parts are efficiently damped.

During the next stroke in opposed direction due to the reaction of the spring 6, the chamber 14 is being reduced and the valve 16 closes the ports 15; therefore the liquid passes from the chamber 14 through into the space 10 through port 19, passage 12' and port 18, while the liquid in space 9 flows into the said space 10 through said passage 12' and port 18. (It is to be held in mind that the passage 12' opens at its end into the space 9).

As the sectional area of the passage 19 is considerably smaller than that of the ports 15, the braking action during the downward movement of the wheel is more efficient than during its upward motion, as required for damping the spring oscillations.

In any case the maximum pressure occurs within the chamber 14 which is separated from chambers 9 and 10 by the partition 5' and piston 11 respectively; no packing is required for preventing leakages of liquids because the liquid which may escape around the stem 12 and piston 11 passes into the spaces 9 and 10 and is always available for operation. Only a weak pressure may arise in the space 10 and therefore the leakages from this space are not material while on the other hand the oil leaking from this space 10 lubricates the contacting surfaces of the member 5 and sleeve 8 which during the running of the car are continuously in motion with respect to each other.

In the construction shown in Figure 2 the absorber comprises a hollow member 5' having solid therewith a pivot 29' for the wheel hub, and said member 5' is mounted to rotate and reciprocate in bearings 8' and 27" connected to the vehicle frame. A spring 6' is located between the shoulders 31' and 38' of the collar 27' and of the member 5' and a protecting sleeve 33" solid with said member 5' encircles said spring and moves freely within the collar 27'. The piston 11' is fastened on a hollow stem 12' which passes through the bored partition 5" of said member 5' and is secured to the top bearing 27"; the space 10' of the member 5' in which is enclosed said piston is sealed by a plug 5'''.

Passages 15' and a valve 16' acted on by a spring 17' are provided in the piston 11' and the passage 12" of the stem 12' opens in the chamber 14' through a port 19" while the communication with the space 9' is provided by a number of ports 23' arranged in a longitudinal row.

When the wheel and member 5' are moved upward, the oil flows into the chamber 14' through ports 15' from the chamber 10', the valve 16' being open, and through passage 12" and ports 23' from the space 9'.

The ports 23' are provided in the stem 12' at such points of the same as to be closed by the member 5" after each other during the displacement of this member with respect to said stem, a larger number of said ports being closed by said member the more this member approaches the upper end of its stroke, therefore the area of the free passage for the liquid is progressively reduced and the motion of said member 5' is damped more strongly when it is near the end of the stroke.

This operation is improved by the fact that the ports 23' have a more reduced sectional area more they are distant from the piston 11' as shown on the drawing.

During the return stroke produced by the spring 6' the chamber 14' is decreasing in volume and as the valve 16' closes at this time, the liquid contained in said chamber 14' must flow through the port 19" and hollow stem 12' into the space 10' and then in the space 9 as soon as the ports 23' are cleared by the partition 5".

In this construction the maximum pressure is produced in the chamber 14' and a lower pressure in space 10', which is sealed at its bottom and is separated from the chamber 14' by the piston 11'.

Therefore no liquid leakage may occur from the chamber 10' and the oil which may escape from the space 14' around the stem 12 enters the space 9 and is thus held in the device for further operation.

Leakages are prevented between the upper portion of the member 5' and the bearing 27" by the contact surface of these parts being increased as the pressure increases in the space 9'.

As above described the damping action is more efficient when the wheel and the member 5' move down than when they move up, because the port 19" through which the liquid issues from the chamber 14' has a smaller sectional area than this chamber and than the total sectional area of the ports 15' and 12".

Attention is called to my copending U. S. patent application 605,103 filed Dec. 5th, 1922, in respect to the features described, but not claimed per se, in this application.

What I claim as my invention and desire to secure by United States Letters Patent is:—

1. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly slidable in the hollow of said member, said member and piston providing two end chambers and an intermediate chamber to be filled with liquid, and means for putting said intermediate chamber into communication with the two end chambers, the last said means providing a throttled flow of liquid when the said supports and member are relatively moved.

2. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly slidable in the hollow of said member, said member and piston providing two end chambers and an intermediate chamber to be filled with liquid, means for connecting said intermediate chamber with the two end chambers and providing a throttled flow of liquid when said supports and member are moved relatively against the resilient means, and means increasing the throttling of said flow when the said supports and member move relatively under the recoil of said resilient means.

3. A shock absorber comprising supports, a hollow member mounted to move in said supports and having a sealed end and a bored intermediate partition, said supports and member being attachable to parts whose respective motion is to be damped, resilient means positioned between said supports and member, a stem fastened to one of said supports and snugly slidable through said bored partition and extending beyond it into said hollow member, a piston carried by said stem and snugly slidable in said hollow member intermediate said bored partition and said sealed end, said piston providing an intermediate chamber between itself and said partition and an end chamber between itself and said sealed end, and having passages interconnecting the said chambers, said stem having a passage leading from the hollow of said member beyond said partition to the end and intermediate chambers, said hollow and chambers receiving liquid.

4. A shock absorber comprising supports, a hollow member mounted to move in said supports and having a sealed end and a bored intermediate partition, said supports and members being attachable to parts whose respective motion is to be damped, resilient means positioned between said supports and member, a stem fastened to one of said supports and snugly slidable through said bored partition to extend beyond it and into said hollow member, a piston carried by said stem and snugly slidable in said hollow member intermediate said bored partition and said sealed end, said piston providing an intermediate chamber between itself and said partition and an end chamber between itself and said sealed end and having passages interconnecting said chambers, and said stem having a passage leading from the hollow of said member beyond said partition and to said end and intermediate chambers, said hollow and chambers receiving liquid, and means for throttling said piston passages when the said supports and member are relatively moved under recoil of said resilient means.

5. A shock absorber comprising supports, a hollow member mounted to move in said supports and having a sealed end and a bored intermediate partition, said supports and members being attachable to parts whose respective motion is to be damped, resilient means positioned between said supports and members, a stem fastened to one of said supports and snugly slidable through said bored partition to extend beyond it into said hollow member, a piston carried by said stem and snugly slidable in said hollow member intermediate said bored partition and said sealed end, said piston providing an intermediate chamber between itself and said partition and an end chamber between itself and said sealed end and having passages interconnecting these chambers, said stem having a passage leading from the hollow of said chamber beyond said partition to said end and intermediate chambers, said passage opening in said hollow through a plurality of ports closable one after the other upon said piston moving away from said bored partition, said hollow and chambers receiving liquid, and means for throttling said piston passages when the said supports and member are relatively moved under recoil of said resilient means.

6. A shock absorber comprising supports, a hollow member mounted to move in said supports and having a sealed end and a bored intermediate partition, said supports and members being attachable to parts whose respective motion is to be damped, resilient means positioned between said supports and member, a stem fastened to one of said supports and snugly slidable through said bored partition to extend beyond it and into said hollow member, a piston carried by said stem and snugly slidable in said hollow member intermediate said bored partition and said sealed end, said piston providing an intermediate chamber between itself and said bored partition, and an end chamber between itself and said sealed end, and having passages interconnecting these chambers, said stem having a passage leading from the hollow of said member beyond said partition to said end and intermediate chambers, said passage opening into said hollow through a plurality of ports adapted to be closed one after the other upon said piston moving away from said bored partition, and having their sectional area reduced as they are distanced from said piston, said hollow and chambers receiving liquid, and means for throttling said piston passage when the said supports and member are relatively moved in a given direction under recoil of said resilient means.

7. A shock absorber comprising supports, a hollow member mounted to move in said supports and providing a tight chamber with one of them, said hollow member having an intermediate bored partition and a sealed end, said supports and member being attachable to parts whose respective motion is to be damped, resilient means positioned between said supports and member, a stem fastened to said chamber closing support and snugly slidable through said bored partition to extend beyond it and into said hollow member, a piston carried by said stem and snugly slidable in said hollow member intermediate said partition and said end, said piston providing an intermediate chamber between itself and said partition and an end chamber between itself and said sealed end, and having passages interconnecting these chambers, said stem having a passage leading from said end chamber and intermediate chamber to the first named chamber between the said support and member, all said chambers receiving liquid, and means for throttling said piston passage when the said supports and member are relatively moved in a given direction under recoil of said resilient means.

8. In a motor car, a shock absorber comprising supports, a hollow member mounted to move in said supports and having a bored intermediate partition, said supports and member being attachable to the car structure and a wheel pivot respectively, resilient means positioned between said supports and member, a stem fastened to one of said supports and snugly slidable through said bored partition to extend beyond it and into said hollow member, a piston on said stem, the piston snugly sliding in the hollow of said member, said member and piston providing two end chambers and an intermediate chamber all receiving liquid, means for connecting said intermediate chamber with the two end ones, the last said means providing a throttled flow of liquid when said supports and member are relatively moved in one direction, and means for increasing the throttling of said flow of liquid when the said supports and member relatively move in an opposite direction under recoil of said resilient means.

In testimony whereof, I have signed my name to this specification.

VINCENZO LANCIA.